United States Patent [19]

Mazzola

[11] Patent Number: 5,262,906
[45] Date of Patent: Nov. 16, 1993

[54] MESSAGE ROUTING FOR SONET TELECOMMUNICATIONS MAINTENANCE NETWORK

[75] Inventor: Anthony J. Mazzola, Plano, Tex.

[73] Assignee: Alcatel Network Systems, Inc., Richardson, Tex.

[21] Appl. No.: 901,346

[22] Filed: Jun. 19, 1992

[51] Int. Cl.$^5$ .............................................. H04Q 11/00
[52] U.S. Cl. .................... 370/54; 370/94.1; 370/94.3
[58] Field of Search ............... 359/135, 136, 137, 138, 359/139, 140, 165; 370/94.1, 84, 112, 94.3, 94.2, 110.1, 54; 307/243, 244; 328/153, 154

[56] References Cited

U.S. PATENT DOCUMENTS

| | | | |
|---|---|---|---|
| 4,866,668 | 9/1989 | Edmonds et al. | 370/94.3 |
| 5,103,447 | 4/1992 | Takiyasu et al. | 370/94.1 |
| 5,134,614 | 7/1992 | Baydar et al. | 370/84 |
| 5,138,615 | 8/1992 | Lamport et al. | 370/94.3 |
| 5,142,529 | 8/1992 | Parruck et al. | 370/84 |

Primary Examiner—Douglas W. Olms
Assistant Examiner—Ajit Patel
Attorney, Agent, or Firm—Bruce C. Lutz; Dennis O. Kraft

[57] ABSTRACT

A routing method, performed by intelligent network elements of a data communications network having SONET applications, for selecting a path from a source network element to a next network element. Each network element has access to a database containing the addresses of its neighboring network elements and their types. To select a next network element, a routing network element first attempts to find a neighboring network element that is the same as the destination network element. If it has no such neighbor, the routing network element then attempts to find a neighbor that is in the same area as the destination, or failing such a neighbor, in the same routing domain. Optionally, the routing network element looks for a neighbor that has been selectively provisioned as a next network element. At each step, candidate network elements are eliminated by using data about their type and application to determine if they call for duplicate paths.

6 Claims, 6 Drawing Sheets

FIG. 5
GENERATE LIST
(ES)
410

FIG. 6
GENERATE LIST
(SELECTIVE)
420

FIG. 8
FILTER SNPA

FIG. 9

MESSAGE ROUTING FOR SONET TELECOMMUNICATIONS MAINTENANCE NETWORK

TECHNICAL FIELD OF THE INVENTION

This invention relates to data communications, and more particularly to administration of a packet switched, connectionless, network. Even more specifically, the invention relates to a method for routing messages of a SONET network.

BACKGROUND OF THE INVENTION

Typical packet-switched data communications systems adhere to some sort of multi-layered communications protocol. These protocol layers include a network layer, whose functions control the transportation of data from source to destination node. Network layer functions are implemented at distributed nodes of the network.

Although the services provided by the network layer may vary in accordance with different switching techniques and sublayer requirements, one common service provided by the network layer is routing. Thus, the network layer includes a routing algorithm that is responsible for deciding on which output link a message packet should be transmitted. Of course, the primary objective of the routing algorithm is that the packet reach its destination. Several other objectives are important, such as minimizing packet transit times, avoiding congestion and deadlocks, and maximizing network throughput. It also desirable that the algorithm be as simple, robust, stable, and fair to users, as possible.

Today's data communications networks use a number of different routing algorithms. An example of a routing algorithm is a broadcast algorithm, in which a message is delivered to all possible destinations.

A routing algorithm that is suitable for one type of message is not always the best algorithm for another topology, especially in SONET networks. For example, broadcast algorithms are suitable for certain topologies, such as tree topologies, but not for other topologies, such as ring topologies. A characteristic of routing algorithms, especially those used for ring topologies, is that more than one route may be selected and used for a given message. In complicated topologies, such as the dual ring topology, duplication of a message along multiple routes could result in substantial network loading.

An alternative to routing algorithms is selective routing, where a network is manually provisioned and routing decisions are made by accessing a database of predetermined paths. Using this approach to routing, all routes between network elements are fixed until the network is reprovisioned, instead of being the result of an algorithm that makes real time routing decisions based on current conditions. If the provisioning is carefully done, some of the problems associated with routing algorithms may be avoided, but the provisioning process tends to be tedious.

Routing algorithms make use of routing protocols to identify the facilities and network elements that provide a path. A routing protocol in common use today is known as the ES-IS routing exchange protocol. This protocol defines all routing nodes as either an end system (ES) or an intermediate system (IS) or both. Under the ES-IS protocol, each routing node is provided with a ES-IS database, which stores the identity of other nodes with whom it has direct connection and whether those neighbors are capable of receiving or routing data. The ES-IS protocol is part of the ISO 9542 standard. In one implementation of the ES-IS protocol, if a node with a message to send has a direct connection to the destination node (an ES), it sends the message to that node; otherwise it sends the message to all network elements that can route (ISs). Although this approach to ES-IS routing avoids manual provisioning, its IS aspects are not efficient in networks having complicated topologies.

Another routing protocol, which is currently under development, is the IS-IS protocol. Routing methods based on this protocol will be able to efficiently handle routing between multiple ISs and will be useful in network having complicated topologies. However, the IS-IS protocol has not yet been fully developed.

Routing decisions can be implemented on interoffice transmission systems as well as on single local area networks. For interoffice communications, a recently proposed protocol for networks using fiber optic links is known as SONET (synchronous optical network). The SONET standards are set out in American National Standards (ANSI) T1.105 and T1.106. A similar standard is the SDH (synchronous digital hierarchy) standard of the International Consultative Committee for Telephone and Telegraph (CCITT). In general, SONET calls for a synchronous fiber optic based data transmission system that supports both synchronous and asynchronous tributaries.

The administration for SONET networks is accomplished by a centralized control system known as TMN (telecommunications maintenance network). Eventually, TMN administration provide routing methods based on the IS-IS routing protocol. However, at this time, routing for SONET networks is accomplished by selective routing, which as stated above, requires manual provisioning of all elements within a network. The provisioning is made difficult by the fact that SONET networks may have a general topology comprised of network applications, each having their own different topology. Development of a suitable routing algorithm has also been hindered by this general topology.

SUMMARY OF THE INVENTION

It is thus an object of the invention to provide a routing method for use with SONET networks, which minimizes message duplication. A further objective is to provide an alternative to the existing method of manually provisioning a network. A still further object is that the method be compatible with future routing protocols that may be developed for SONET networks. As a result of the invention, networks using its routing method do not require manual provisioning, except as an optional alternative in low probability situations when more efficient routing techniques do not produce a suitable path. When the network is set up, or when a new element is added, all that is required is the assigning of a network address. The addressing scheme of the invention is compatible with the anticipated IS-IS standard. The method efficiently handles loops that may be introduced to the network by SONET applications, such as dual rings.

BRIEF DESCRIPTION OF THE DRAWINGS

Other objects and advantages of the present invention will be apparent from a reading of the specification and appended claims in conjunction with the drawings, wherein:

DETAILED DESCRIPTION OF THE INVENTION

Overview of the Invention

Figure 1:
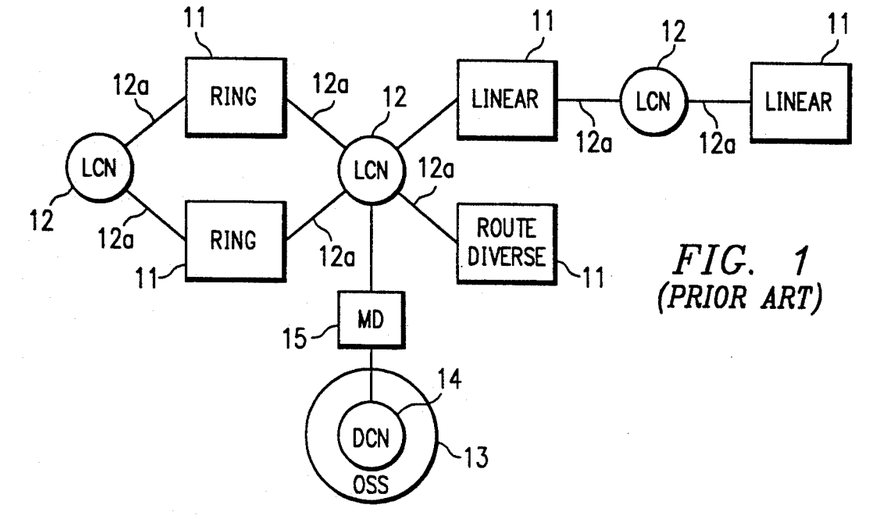
FIG. 1 illustrates a general topology for a data communications network.

FIG. 1 illustrates a SONET network from a network administration point of view, i.e., that of the TMN. A number of different SONET applications 11 are interconnected in a general network topology. Because of the size and complexity of the network, local communications networks (LCNs) 12 are used to provide data communications for administrative purposes. Telephonic facilitates, such as DS0 and DS1 lines that are connected to the applications 11, are not shown.

The network topology is general in the sense that, as explained below in connection with FIGS. 2A-2C, each application 11 may have a different configuration. Some of the applications may be combined to form more complicated configurations. For example, in FIG. 1, two ring applications 11 are connected to two LCNs 12 to form a dual ring configuration.

LCNs 12 may be well-known local network types, such as LANs. Typically, at least one LCN 12 is associated with a central office. Each LCN 12 is connected to one or more applications 11 by means of an LCN channel 12a. LCNs 12 provide a means for interconnecting applications 11 for administrative communications from central offices.

Operations support system (OSS) 13 provides a means for the network service provider to deliver administrative commands. Ideally, OSS 13 is at a central site, for centralized control over functions such as service order processing, testing, and trouble reporting and resolution. OSS 13 is implemented on a data communications network (DCN) 14, which follows a packet switched protocol such as the X.25 standard. Mediation device 15 guarantees interoperability between the OSS 13 and the physical network elements of applications 11. As an alternative to mediation device 15, an application 11 might permit direct connection to DCN 14 via some sort of X.25 interface.

For purposes of this description, the network of FIG. 1 is a packet switched, connectionless, network. Messages are handled by multiple protocol layers as PDU's (protocol data units). At each routing node, a network layer provides a datagram service, which means that the network layer accepts PDU's from a transport layer and executes some sort of routing decision process to determine a next node to which the PDU will be routed. At the network layer, the PDU is referred to as the NPDU (network PDU). The NPDU's are delivered independently, which means that they are not necessarily in order. Also, at every point in time, the routing decision for a particular NPDU is based on current conditions, which may vary according to factors such as congestion, error status, or the like.

The network of FIG. 1 has distributed routing control, in the sense that its applications 11 are comprised of intelligent network elements, each having the ability to make routing decisions. The routing is also "dynamic" in the sense that a path is selected as the PDU travels, rather than being pre-determined and indicated by data in the PDU. The routing decision at a network element results in selection of a next subnetwork point of attachment (SNPA). Each segment of the data units path begins and ends at a SNPA. The data unit is routed on channels of communications lines, from a source SNPA to a routing SNPA, which will decide on a next SNPA.

The network layer is also responsible for supporting the end user's negotiation of services with a network provider. The different services that are available are referred to as quality of service (QOS) features. They include features such as negotiated cost versus speed of delivery, the size of the data unit, and security features. When a certain QOS feature has been requested for a message, the NPDUs that carry the message contain data representing the QOS request. As explained below in connection with FIGS. 4-6, the routing process of the invention includes consideration of QOS requests.

Figure 2A:
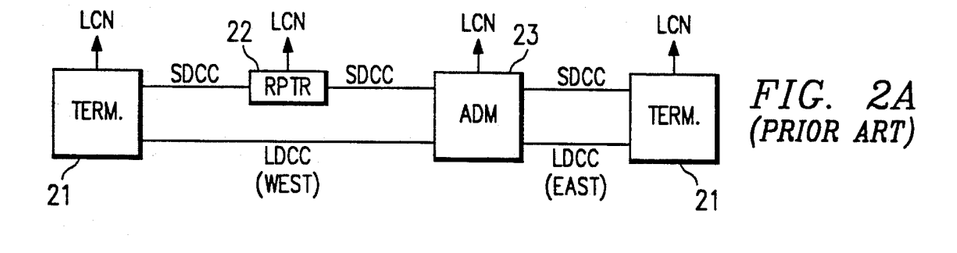
FIGS. 2A-2C illustrate the subnetwork topologies of the network of FIG. 1.
Figure 2B:
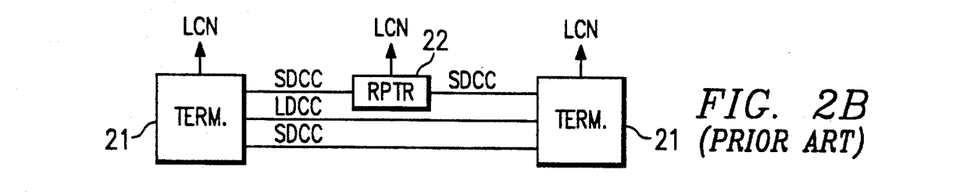
Figure 2C:
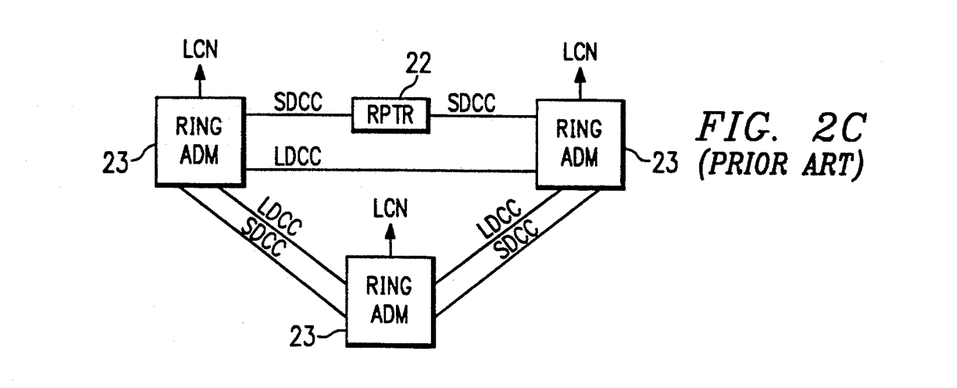
Figure 3:
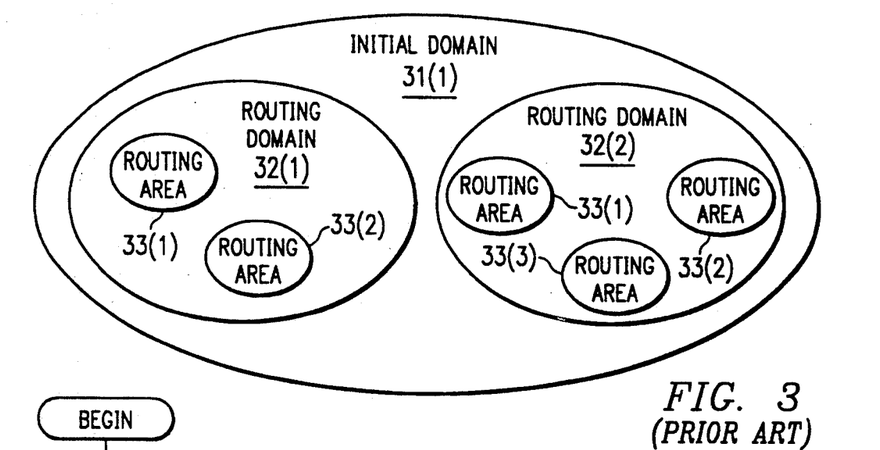
FIG. 3 illustrates the addressing scheme for IS-IS routing.
Figure 4:
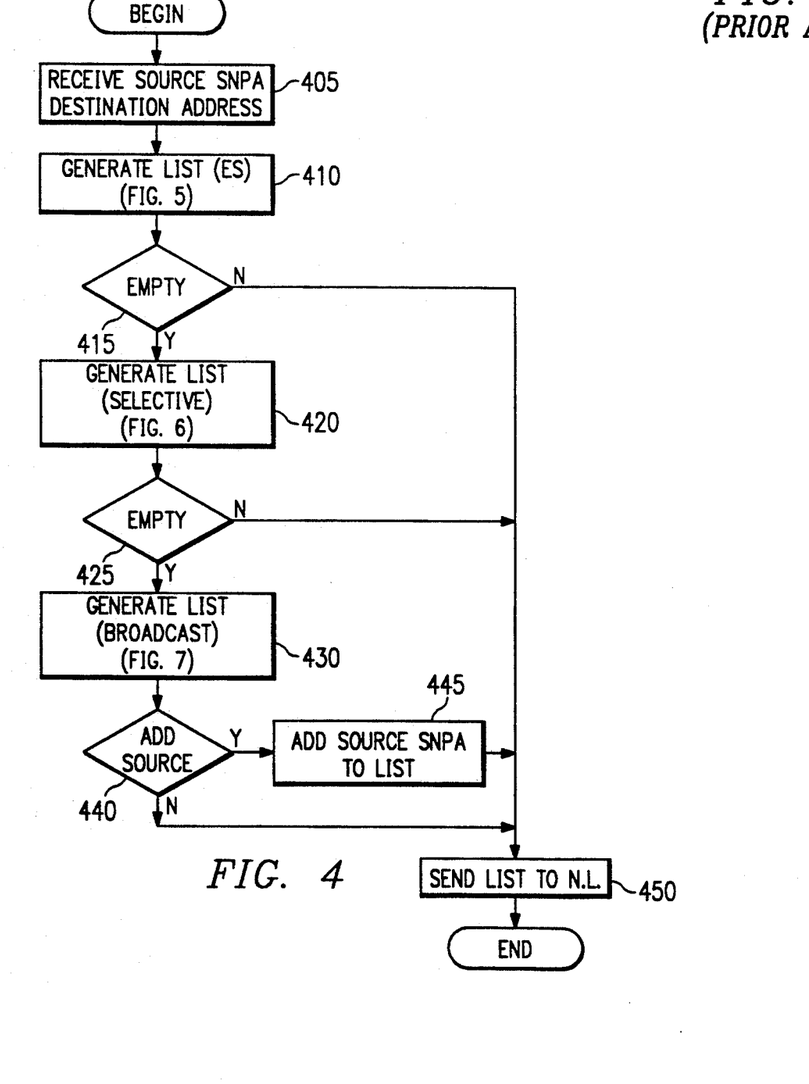
FIG. 4 illustrates the basic steps of the routing process of the invention.
Figure 5:
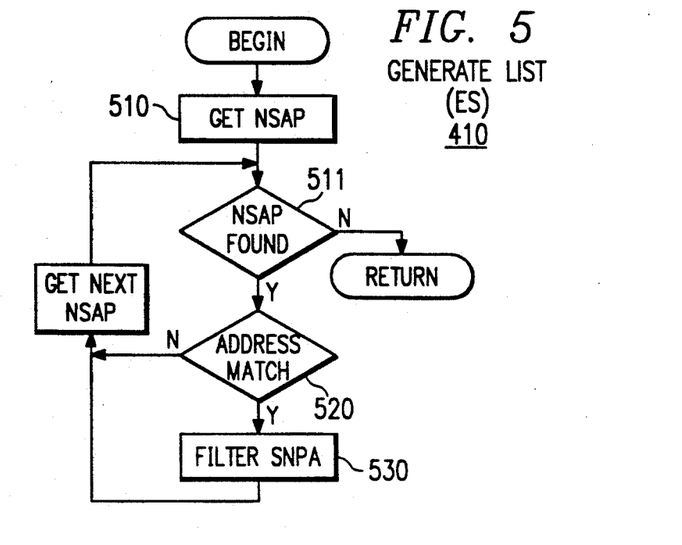
FIG. 5 illustrates the ES list generation step of FIG. 4.
Figure 6:
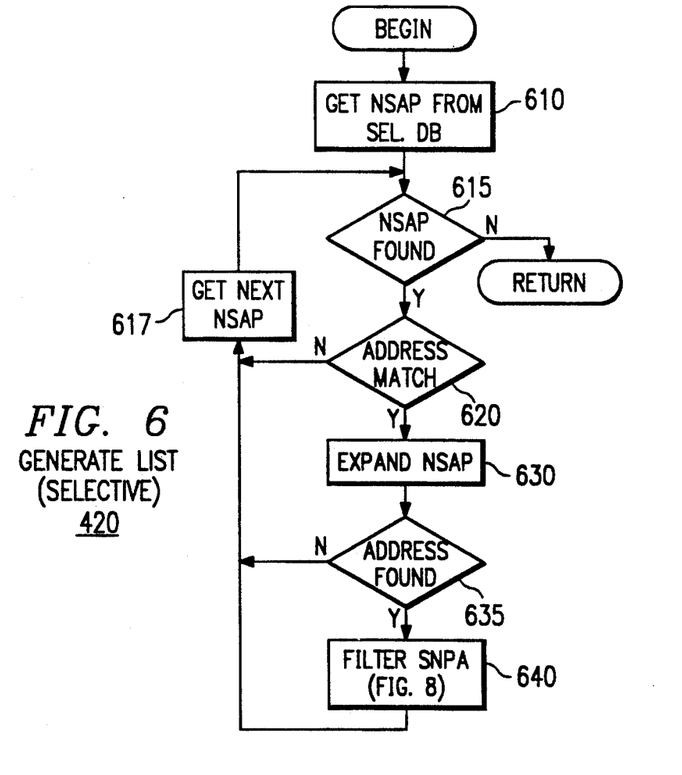
FIG. 6 illustrates the selective list generation step of FIG. 4.

As an overview of the following description, FIGS. 2A-2C illustrate how the SONET applications 11 have various types of network elements, each of which performs a routing process to select at least one next SNPA, and preferably only one next SNPA. FIG. 3 illustrates how the SONET network is mapped to the IS-IS addressing protocol for use in making routing decisions that avoid broadcasting to all ISs. FIGS. 4-6 illustrate the routing process of the invention, by means of which a routing network element generates a list of at least one next SNPA. The routing process has three SNPA list generation steps, each of which accesses a different pool of candidate SNPAs from the routing network element unique ES-IS database. A first list generation step accesses a database of other network elements that are ESs relative to the routing network element, and determines whether the routing network element has a neighboring ES that is also the destination network element. If the first list generation step fails to produce an SNPA, a second step accesses a database of neighbors of the routing network element to determine if a path to the destination network element has been selectively provisioned. If the second step fails to produce an SNPA, a third approach accesses a database of neighboring ISs to determine if there are SNPAs that are in the same routing area as the destination, or if there are none, in the same routing domain. At each stage, candidate SNPAs are filtered with tests to eliminate duplicate paths. Also, if a candidate SNPA is out of service, the routing process decides whether to add the source SNPA to the SNPA list so that backtracking can be used as a remedy to recover after a network failure.

Sonet Applications and Network Elements

FIG. 2 illustrates the SONET applications 11 of FIG. 1 in further detail, again from an administrative communications point of view. Each application 11 has some combination of SONET compatible network elements, such as terminals 21, repeaters 22, and add/drop multiplexors 23. Each network element is an intelligent device, in that it has the capability to make routing decisions in accordance with the method of the invention. The processor-based means for providing this intelligence, and supporting memory, are referred to herein as the network element's "intelligence". Within each SONET application 11, network elements are connected by data communications channels (DCCs), which under the SONET standard, provide a control network embedded within the transport network. SDCCs (section data communications channels) and LDCCs (line data communications channels) are two types of such embedded overhead channels. SDCCs have a data rate of 192 kilobits per second; LDCCs have a data rate of 576 kilobits per second. Each LDCC or SDCC enters a network element at an SNPA of that network element. As shown, a network element can have more than one SNPA, depending on the path to the network element.

Terminals 21 are referred to as such because the terminate SDCCs and LDCCs and provide an interface to telephonic facilities. Terminals 21 may be route diverse terminals, as in FIG. 2B, in which case they terminate two SDCCs that follow geographically distinct paths for purposes of safeguarding against optic fiber line cuts. Thus, there are two sets of SNPAs representing two SDCC paths to the same terminal 21. Although FIG. 2B shows the two route diverse paths with only one having a repeater 22, each route diverse path may be comprised of SDCCs connected by multiple repeaters 22.

Repeaters 22 are used to extend the geographic reach of optical fiber lines. A repeater 22 is a section terminating network element; it has access to SDCCs but not LDCCs. LDCCS pass through repeaters 22 without being accessed by them. If an application 11 has a number of SDCCs connected by multiple repeaters 22, the repeaters are "collapsed" and viewed as a single repeater 22 with multiple network addresses. This is accomplished by forwarding a "hello" message from each repeater 22 to the next terminal 21 or ADM 23 so that all repeaters 22 may be treated as one.

Add/drop multiplexors (ADMs) 23 are used in linear applications to drop and add a variety of low speed tributary signals from or to a high speed signal, such as is carried on a SONET facility. Uni-directional ADM's 23 are used in ring applications. Both types of ADM's 23 are line terminating and section terminating. Thus, like terminals 21, ADMs 23 terminate SDCCs and LDCCs and are also connected to telephonic facilities. However, ADMs 23 can have SDCCs and LDCCs in two directions, such as the "east" and "west" SDCCs and LDCCs of FIG. 2A.

As explained below, characteristics of each application 11 are used during the routing process to determine an efficient route. For example, a network element may have "related" SNPAs in the sense that it terminates both an SDCC and an LDCC, or in the sense that it terminates two SDCCs or two LDCCs from different directions. Often, knowledge by a routing network element of this characteristic of a proposed SNPA can be used to avoid duplicate paths. However, the avoidance of duplicate paths caused by related SNPAs depends on the type of application 11 that the network element is in. For example, a characteristic of repeaters 22 in the route diverse and ring applications of FIGS. 2B and 2C, is that they have access to a loop back on another SDCC to a source network element. In the linear application of FIG. 2A, repeater 22 has no such access. Thus, certain duplicate paths that can be eliminated in route diverse and ring applications, are not eliminated in linear applications. The use by a routing network element of characteristics of SONET applications 11 to make a routing decision is discussed below in connection with FIG. 8.

It is assumed that each network element supports the ES-IS (end system—intermediate system) routing exchange protocol, which is an OSI standard, published as OSI 9542 and incorporated herein by reference. If a network element in the network does not support this protocol, it will not receive messages routed in accordance with the invention. In the ES-IS protocol, an end system (ES) is one that can receive a message. An intermediate system (IS) is one that merely routes messages. Each network element of FIGS. 2A-2C is both an ES and an IS if it is connected to a LAN 12. The ES-IS protocol calls for knowledge by each network element of the address and type of each network element to which it has a direct connection.

IS-IS Addressing

FIG. 3 illustrates how a SONET network may be mapped to an IS-IS addressing scheme. The IS-IS protocol provides addresses that organize the network hierarchically into initial domains 31, routing domains 32, and routing areas 33. The IS-IS addressing scheme is set out as the ISO 10589 standard, publication of which is incorporated herein by reference.

In the IS-IS scheme, a routing area 33 is a set of network elements. A set of routing areas 33 is a routing domain 32. As a result of the grouping of areas 33 into domains 32, a network element may provide data, in the form of its unique identifier, about the area 33 it serves. The initial domain 31 is a set of routing domains 32. An inter-domain routing protocol is required for routing between different initial domains 31, and is beyond the scope of this invention.

To implement the invention, the IS-IS addressing scheme is mapped to a SONET network. A single SONET application 11, i.e., one of the applications 11 of FIGS. 2A-2C, corresponds to a routing area 33. Multiple linear applications 11 may be combined into a single routing area 33 if they are connected by LCNs 12 into a tree topology. A routing area 33 may not be split apart and separated by any other routing area 33, and is a contiguous set of network elements.

A SONET network controlled by a single OSS administrative system corresponds to a routing domain 32. If a network has more than one OSS system, a number of such systems can be identified as the initial domain 31.

For purposes of this description, network elements are identified with a network service assess port (NSAP) address and with a network element title (NET). Although a distinction between these two types of identifiers is relevant for other network purposes, "NSAP" is used herein to refer to either type of address. As an example of an addressing format, a four-field NSAP might have a field for the initial domain, routing domain, routing area, and system identifier, respectively. For example, where the address "A.B.C.D" has such a format, all network elements of FIG. 1 will have a common initial domain address, i.e., 1.B.C.D. The applications 11 administered by OSS 13 are in the same routing domain 32, and have a common initial domain field and routing domain field, i.e., 1.1.C.D. Each application 11 has a unique area, such that one application 11 might have an address 1.1.1.D. Each network element within the application 11 would also have a unique identifier value in the system identifier field of its address.

As explained below, the routing process performed by a network element that is being asked to route a data unit includes at least one SNPA list generation step. In this step, NSAPs are retrieved from that network element's database, and the addresses of these NSAPs are compared to that of the destination NSAP. Once a match is found, an SNPA can be associated with that NSAP to define a path to the network element having that NSAP.

Operation of the Invention

FIG. 4 illustrates the basic steps of the routing process of the invention. Each network element of each SONET application 11 is provided with an processing intelligence, with an ES-IS database, and optionally a database of selectively provisioned paths. This intelligence and data permit it to perform a selection process for choosing the best SNPA to the next network element of a path to a destination network element within the SONET network.

The databases identify the routing network element's directly connected neighboring network elements in terms of the NSAP address discussed above in connection with FIG. 3. Each network element also stores data about what SONET application 11 it is in, which indicates the network elements to which it is connected and the relationships of its SDCCs and LDCCs.

As an overview of the process, steps 410–430 of the selection process include three SNPA list generation steps, each of which may generate a list of one or more next SNPA's. The second and third list generation steps are conditional, in the sense that they are performed only if a preceding step fails to generate an SNPA. During each list generation step, each candidate SNPA is evaluated in accordance with a number of tests to determine whether it should be eliminated, replace another SNPA already on the list, or be added to the list. After the list generation steps, the process determines whether the source SNPA should be added to the list, which accommodates for out of service network elements by permitting backtracking. Finally, the list of SNPAs, which ideally is reduced to a single SNPA, is sent to a network layer function so that the routing decision can be carried out.

More specifically, in step 405, the network element that is to make a routing decision, i.e., the "routing network element", receives an NPDU and a routing request. The NPDU's routing data includes the SNPA of the network element from which it came (the source SNPA) and the NSAP of the destination network element. The routing data may also include a QOS request.

Step 410 attempts to generate an SNPA that is also the destination network element. Step 410 requires each network element to have access to an ES database, which stores the NSAPs of those network elements to which it is directly connected and which can receive the data unit.

FIG. 5 illustrates step 410 in further detail. In step 510, the routing network element retrieves a NSAP from its database. If a NSAP is found, step 520, is determining whether the NSAP address matches the NSAP address of the destination network element. For this matching decision, all four fields of the addresses are considered; an exact match of initial domain, routing domain, area, and system identifier, is required. If there is a match, the NSAPs corresponding SNPA is used for routing. In this manner, if the routing network element's directly connected neighboring network element is the destination, the data unit will be routed directly there. If the addresses do not match, a next NSAP is retrieved from the database.

As a result of steps 510 and 520, the ES list generation step 410 generates candidate SNPAs that are directly connected and that represent the destination network element. Thus, from the point of view of the routing network element, it need only route to an ES. Of course, it is possible that ES list generation might fail to produce any matches, in which case the list of step 410 will be empty and the SNPA will be the result of another list generation step, i.e., step 420 or step 430.

Continuing with the substeps of step 410, as shown in FIG. 5, if result of step 520 is an address match, step 530 is testing the candidate SNPA against various filtering tests. This step is performed because there may be more than one direct path to a destination network element, and thus more than one candidate SNPA can have an NSAP address that matches the destination address. As stated above, an object of the invention is to avoid duplication of routes.

The filtering process is essentially the same for all three list generation steps, except for some additional tests performed during the IS list generation step 430. The filtering tests are described below in connection with FIG. 8, and result in a candidate SNPA being eliminated, being used to replace another candidate SNPA, or being added to the SNPA list.

Referring again to FIG. 4, if the ES list generation step 410 does not produce any SNPAs, step 420 is generating an SNPA list based on a database of selectively provisioned routes. Step 420 is optional, and is used primarily to remedy low probability routing conditions that could be made more efficient. For example, if step 420 does not result in an SNPA, and step 430 would not generate an SNPA in the same routing area 31 as the routing network element, a list of SNPAs in another area 31 would be generated. This could result in duplication. However, in this situation, an NSAP representing a single SNPA could be provisioned and stored in the selective database. Other duplicate SNPAs that result from exceptions to the filtering steps discussed below in connection with FIG. 8 can also be avoided by selective provisioning.

FIG. 6 illustrates the substeps of step 420. Step 610 is retrieving a NSAP from a database of selectively provisioned network elements. In this database, each neighboring network element is matched to at least one additional network element. The NSAP address of the neighboring network element may include "wildcard" address fields, which as explained below, may be filled in by accessing the IS database. As in step 410, step 420 is performed candidate by candidate. When step 625 determines that there are no more candidates, step 420 re-enters the main routing process flow of FIG. 4.

If step 610 generates an NSAP, step 620 is performing an address match. The retrieved NSAP is compared against the NSAP of the destination network element to determine if a path has been provisioned. If there is no match, a next NSAP is retrieved.

If step 620 results in an address match, step 630 is expanding the any wildcarded fields in the NSAP address of the neighboring network element associated with the retrieved NSAP by accessing the IS database. The wildcarded NSAP is compared against NSAPs in the IS database, ignoring any wildcarded fields for purposes of the comparison. When a match is found, the associated SNPA is used as candidate SNPA.

If a candidate SNPA emerges from step 635, step 640 is filtering the SNPA by applying the filtering tests discussed below in connection with FIG. 8. The candidate SNPA is eliminated or added to the list, and the process returns to the main process flow of FIG. 4.

If the selective list generation step 420 does not produce any candidate SNPAs, in step 430, a list of candidate SNPAs is generated by means of a modified broadcast algorithm. Step 430 is based on providing each network element with an IS database of the NSAPs of neighboring network elements that can route for it.

Figure 7:
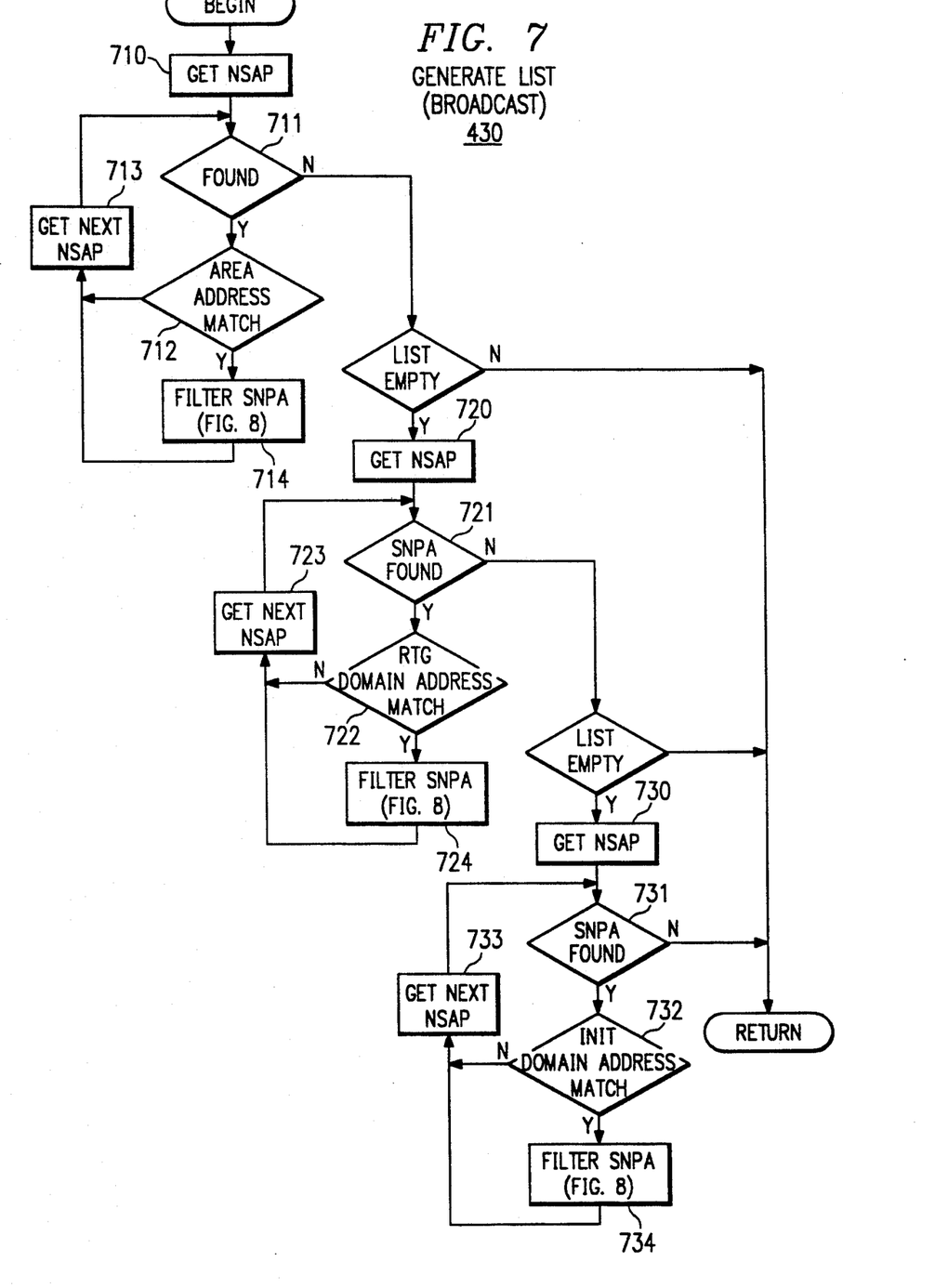
FIG. 7 illustrates the IS list generation step of FIG. 4.

FIG. 7 illustrates the substeps of step 430. In general, step 430 has three tiers of substeps. In a first tier, steps 710–714, NSAP addresses are retrieved from the IS database and every NSAP is compared with the NSAP of the destination. If the addresses have the same initial domain, routing domain, and area identifier, the associated SNPA is used as a candidate SNPA and filtered.

If there are no SNPAs that survive steps 710–714, a second tier, steps 720–724, again compare NSAPs against the destination NSAP, but this comparison uses only the initial domain and routing domain fields and ignores the area field. If the NSAP addresses are in the same routing domain, the associated SNPA is used as a candidate and passed to the filtering step.

Finally, if no candidate SNPAs survive the second tier, a third tier, steps 730–734, generates candidate SNPAs from the same initial domain.

As a result of the modified broadcast list generation step 430, once a NPDU enters its destination routing area, it will not exit it. A new routing area is selected if the routing network element is asked to route a NPDU that is not destined for one of its neighbors in the same area. Likewise, once an NPDU enters its destination routing domain, it will not exit that domain, unless backtracking is performed. This prevents NPDUs from unduly loading the network.

Figure 8:
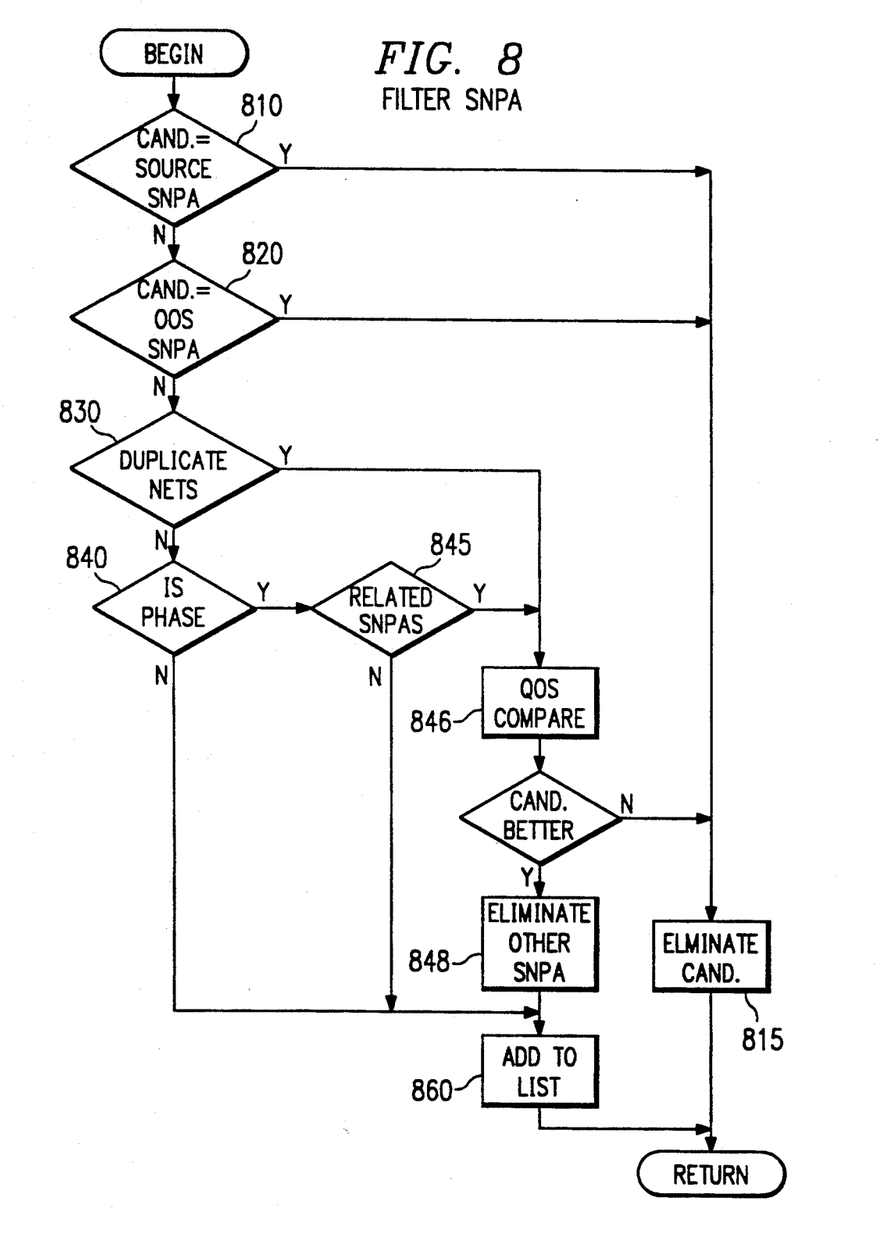
FIG. 8 illustrates the filtering steps of FIGS. 5, 6, and 7.

FIG. 8 illustrates the filtering substep that is performed as part of each of the list generation steps 410, 420, and 430 of FIGS. 5–7. The goal of the filtering step is test each candidate SNPA against various network conditions so that those that will result in multiple paths to the same network element can be eliminated. Several of the filtering steps are based on providing each network element with data representing its own network element type and what type of application 11 it is in. In several filtering steps, related SNPAs are eliminated or chosen on the basis of QOS requests.

Step 810 is eliminating any candidate SNPA that is the source SNPA. Also, during the broadcast list generation step 430, if the source SNPA is from an LCN, all other SNPAs on that LCN 12 are eliminated.

Step 820 is eliminating any candidate SNPA to an out of service network element. For this step, it is assumed that the network provides some means for notifying the routing network element when one of the network elements in its database has a failure and which SNPAs are affected.

Step 830 is determining whether any two candidate SNPAs have a duplicate NSAP. Step 830 thereby avoids two SNPAs at the same network element. If there is a duplication, step 835 is performing a comparison of the paths based on QOS. For example, the QOS comparison might be based on whether the NPDU requests "cost over delay" or "delay over cost". The SNPA that best meets the QOS request is added to the list and the other is eliminated.

Steps 845–848 apply only during the broadcast list generation step 430, as determined in step 840. In general, these steps optimize the routing decision by using a QOS request and data about related SNPAs. More specifically, if the application 11 of the candidate SNPA is known, it is also known whether any two SNPAs are related in the sense that they are associated with an LDCC and an SDCC terminating at the same network element. If the NPDU specifies "transit delay over cost" QOS, then the SNPA associated with the SDCC is filtered out. If the NPDU specifies "cost over transit delay" QOS, then the SNPA associated with the LDCC is filtered out. This filter does not apply to candidate SNPAs of repeaters 22 or to SNPAs whose SDCC or LDCC is disabled.

Step 845 also determines whether the list contains related SNPAs, in the sense that two SNPAs are associated an SDCC pair or an LDCC pair terminating from different directions at the same network element. If so, a choice of one SNPA is made. This choice can be aided by a QOS request. This filter does not apply to repeaters 22 in linear applications, except if the requested QOS is "transit delay over cost".

In step 860, if the candidate SNPA has not been eliminated in steps 810–850, it is added to the list of next SNPAs. Ideally, the list is filtered to one next SNPA.

Referring again to FIG. 4, if the broadcast list generation step 430 has been performed, resulting in a SNPA list that contains broadcasted SNPAs, step 440 is determining whether the source SNPA should be added to the list. If the SNPA list contains ES or selective SNPAs, it is already determined that the path is valid. However, in the broadcast list generation step 430, the SNPA list may call for an out of service SNPA. If so, and if the out of service SNPA is not related to the source SNPA, such as by being from the same direction, the source SNPA is added to the list. This back-tracking to the source SNPA permits network elements that have previously routed the NPDU to choose a different path and thereby provide recovery from an error.

In step 450, the SNPA list is sent to the network layer function that will carry out the routing decision.

Figure 9:
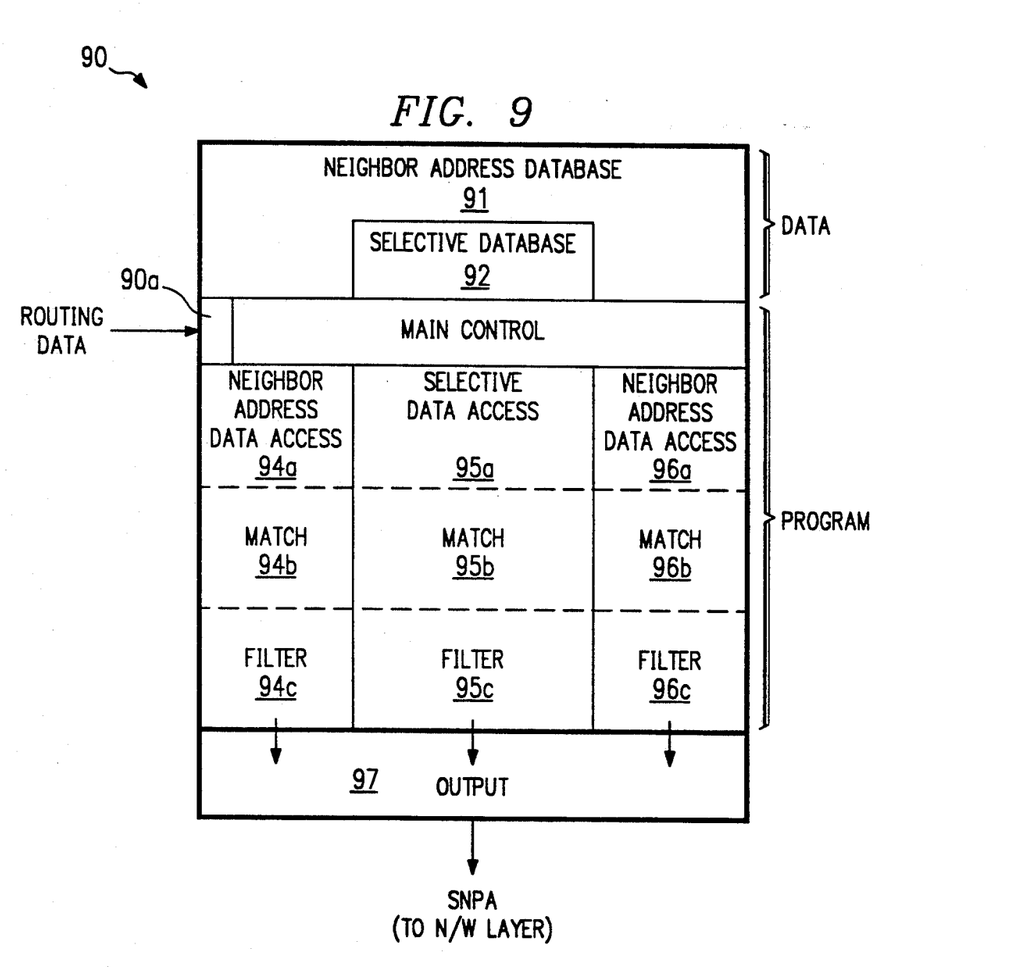
FIG. 9 illustrates the data and program contents of a network element in accordance with the invention.

FIG. 9 illustrates a routing candidate selection unit 90 of an intelligent network element, such as elements 21, 22, or 23. Each selection unit 90 has a input means 90a for receiving address data contained in a data unit. Two databases, a neighbor address database 91 and a selective database 92, store data to be used in selecting a next SNPA in accordance with the invention.

Three processing means 94–96 are programmed to perform the three list generation steps 410, 420 and 430. Each processing means 94–96 has data access means 94a, 95a, and 96a, which are programmed for accessing the appropriate database in accordance with steps 510, 610, and 710. Each processing means also has address matching means 94b, 95b, and 96b, which are programmed for matching addresses in accordance with steps 520, 620, 712, 722, and 732. Finally, each processing means has address filtering means 94c, 95c, and 96c, which are programmed for filtering candidate SNPAs in accordance with steps 530, 640, and 734.

An output means 97 is in communication with other routing functions of the network layer. It delivers a list of candidate SNPAs so that the routing decision made by routing candidate selection unit 90 can be implemented.

As a summary of the invention, it provides a routing process to be performed by the network elements, i.e., distributed routing nodes, of a general topology network. In practical application, for example, it provides a routing process for the network elements of a SONET network. No manual provisioning is required for the TMN network other than assigning network addresses to the network elements at installation time. The process attempts to avoid duplication of messages, especially those that would otherwise be caused by loops that are introduced to a network by SONET applications using rings. The use of IS-IS addressing provides compatibility with that routing protocol.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

We wish to be limited, not by the embodiments illustrated and described, but only by the scope of the appended claims, wherein we claim:

1. A method, performed by an intelligent network element of a data communications network having SONET applications, for selecting a path from a source subnetwork point of attachment (SNPA) to a next SNPA, comprising the steps of:
   identifying each network element with an address that identifies that network element, its routing area, which includes all network elements in the same SONET application as that network element, and its routing domain, which routing domain includes all network elements in said routing area and in at least one other routing area;
   providing a database accessible by each network element, which stores the address and type of each neighboring network element, wherein neighboring network elements are those to which that network element is directly connected;
   when a data unit arrives at a routing network element, performing a first list generation step by (1) accessing said database to retrieve neighboring addresses, (2) determining whether any neighboring address and the destination address of the destination network element are the same, and if so, designating a candidate SNPA associated with that address, and (3) determining whether any two candidate SNPAs would result in a duplicate path, and if so, eliminating one of them as a candidate SNPA;
   if said first list generation step does not produce at least one candidate SNPA, performing second list generation step by (1) determining whether the areas and domains of any neighboring address and said destination address are the same, and if so, designating a candidate SNPA associated with that address, and (2) determining whether any two candidate SNPAs results in a duplicate path, and if so, eliminating one of them as a candidate SNPA; and
   routing said data unit to a network element associated with a remaining candidate SNPA.

2. An intelligent network element comprising one of many network elements in a SONET data communications network, each having substantially similar data processing capability for selecting a path from a source subnetwork point of attachment (SNPA) to a next SNPA, and each having an address that identifies that network element, its routing area, which includes all network elements in the same SONET application as that network element, and its routing domain, which routing domain includes all network elements in said routing area and in at least one other routing area, comprising:
   an address database, which stores the address and type of each neighboring network element, wherein neighboring network elements are those to which that network element is directly connected;
   an input means for receiving a data unit from a prior routing network element;
   a data access means for accessing said address database to retrieve addresses of neighboring network elements;
   a first address matching means, in communication with said input means nd said data access means, for determining whether any retrieved address and the destination address of the destination network element are the same, and if so, for designating a candidate SNPA associated with the address;
   a first address filtering means, in communication with said first address matching means, for determining whether nay two candidate SNPAs would result in a duplicate path, and if so, for eliminating one of them as a candidate SNPA;
   a second address matching means in communication with said data access means, for determining whether the area nd domain of any retrieved address and said destination address are the same, and if so, for designating a candidate SNPA associated with that address;
   a second address filtering means, in communication with said second address matching means, for determining whether any two candidate SNPA result in a duplicate path, and if so, eliminating one of them as a candidate SNPA; and
   an output means for delivering said data unit to a network element associated with a remaining candidate SNPA.

3. A method, performed by an intelligent network element of a data communications network having SONET applications, for selecting a path from a source subnetwork point of attachment (SNPA) to a next SNPA, comprising the steps of:
   identifying each network element with an address that identifies that network element, its routing area, which includes all network elements in the same SONET application as that network element, and its routing domain, which routing domain includes all network elements in said routing area and in at least one other routing area;
   providing a database accessible by each network element, which stores the address and type of each neighboring network element, wherein neighboring network elements are those to which that network element is directly connected;
   providing a second database accessible by each network element, which stores addresses of network elements to which paths are predetermined;
   when a data unit arrives at a routing network element, performing a first list generation step by (1)

accessing said database to retrieve neighboring addresses, (2) determining whether any neighboring address and the destination address of the destination network element are the same, and if so, designating a candidate SNPA associated with that address, and (3) determining whether any two candidate SNPAs would result in a duplicate path, and if so, eliminating one of them as a candidate SNPA;

if said first list generation step does not produce at least one candidate SNPA, performing second list generation step by (1) accessing said second database to retrieve provisioned addresses (2) determining whether any provisioned address and said destination address are the same, and if so, designating a candidate SNPA associated with that address;

if said second list generation step does not produce at least one candidate SNPA, performing a third list generation step by (1) determining whether the area nd domain of any neighboring address and said destination address are the same, and if so, destination a candidate SNPA associated with that address and (2) determining whether any two candidate SNPAs would result in a duplicate path, and if so, eliminating one of them as a candidate SNPA; and routing said data unit to a network element associated with a remaining candidate SNPA.

4. An intelligent network element comprising one of many network elements in a SONET data communications network, each having substantially similar data processing capability for selecting a path from a source subnetwork point of attachment (SNPA) to a next SNPA, and each having an address that identifies that network element, its routing area, which includes all network elements in the same SONET application as that network element, and its routing domain, which routing domain includes all network elements in said routing area and in at least one other routing area, comprising:

a neighboring address database accessible by each network element, which stores the address and type of each neighboring network element, wherein neighboring network elements are those to which a network element is directly connected;

a provisioned address database, which stores the address of network elements to which paths have been predetermined;

an input means for receiving a data unit from a prior routing network element;

a first data access mean for accessing said address database to retrieve addresses of neighboring network elements;

a first address matching means, in communication with said input means nd said data access means, for determining whether any retrieved address and the destination address of the destination network element are the same, and if so, for designating a candidate SNPA associated with the address;

a first address filtering means, in communication with said first address matching means, for determining whether nay two candidate SNPAs would result in a duplicate path, and if so, for eliminating one of them as a candidate SNPA;

a second data access means, for accessing said provisioned address database to retrieve provisioned addresses;

a second address matching means, in communication with said second data access means, for determining whether any provisioned address and said destination address are the same, and if so, for designating a candidate SNPA associated with that address;

a third address matching means, in communication with said first data access means, for determining whether the area and domain of any neighboring address and said destination address are the same, and if so, for designating a candidate SNPA associated with that address;

a second address filtering means, in communicating with said third address matching means, for determining whether any two candidate SNPAs would result in a duplicate path, and f so, for eliminating one of them as a candidate SNPA; and an output means for routing said data unit to a network element associated with a remaining candidate SNPA.

5. A method, performed by an intelligent network element of a data communications network having SONET applications, for selecting a path from a source subnetwork point of attachment (SNPA) to a next SNPA, comprising the steps of:

identifying each network element with an address that identifies that network element, its routing area, which includes all network elements in the same SONET application as that network element, and its routing domain, which routing domain includes all network elements in said routing area and in at least one other routing area;

providing a database accessible by each network element, which stores the address and type of each neighboring network element, wherein neighboring network elements are those to which that network element is directly connected;

providing a second database accessible by each network element, which stores addresses of network elements to which paths are predetermined, each associated with at least a partial address of a neighboring network element;

when a data unit arrives at a routing network element, performing a first list generation step by (1) accessing said database to retrieve neighboring addresses, (2) determining whether any neighboring address and the destination address of the destination network element are the same, and if so, designating a candidate SNPA associated with that address, and (3) determining whether any two candidate SNPAs would result in a duplicate path, and if so, eliminating one of them as a candidate SNPA;

if said first list generation step does not produce at least one candidate SNPA, performing second list generation step by (1) accessing said second database to retrieve provisioned addresses (2) determining whether any provisioned address and said destination address are the same, and if so, (3) accessing said first database to match a partial address associated with that provisioned address to one or more fields of an address stored in said first database to determine the address of a candidate SNPA;

if said second list generation step does not produce at least one candidate SNPA, performing a third list generation step by (1) determining whether the area nd domain of any neighboring address and said destination address are the same, and if so, destination a candidate SNPA associated with that address and (2) determining whether any two candidate SNPAs would result in a duplicate path, and if so, eliminating one of them as a candidate SNPA; and routing said data unit to a network element associated with a remaining candidate SNPA.

6. A SONET application for routing messages with a minimum of message duplication, comprising:

a number of intelligent network elements, each having substantially similar data processing capability for selecting a path from a source subnetwork point of attachment (SNPA) to a next SNPA, and each having an address that identifies that network element, its routing area, which includes all network elements in the same SONET application as said network element, and its routing domain, which routing domain includes all network elements n said routing area and in at least one other routing area;

wherein each network element has the following element (1) a neighboring address database accessible by each network element, which stores the address and type of each neighboring network element, wherein neighboring network elements are those to which a network element is directly connected, (2) a provisional address database, which stores address of network elements to which paths have been predetermined, (3) an input mean for receiving a data unit form a prior routing network element, (4) a first data access mean for accessing said neighboring address database to retrieve address of neighboring network elements, (5) a first address matching means for determining whether any neighboring address and the destination address are the same, and if so, for designating a candidate SNPA associated with that address, (6) a first address filtering means for determining whether nay two candidate SNPAs would result in a duplicate path, and if so, eliminating one of them as a candidate SNPA, (7) a second data access mean for accessing said provisional address database to retrieve provisioned addresses if said first list generation step does not produce at least one candidate SNPA, (8) a second matching means for determining whether any provisioned address ad said destination address are the same, and if so, for designating a candidate SNPA associated with that address, (9) a third matching means for determining whether the area nd domain of any neighboring address and said destination address so, for designating a candidate SNPA associated with that address, (10) a second address filtering means for determining whether any two candidate SNPAs would result in a duplicate path, and if so, for eliminating one of them as a candidate SNPA, and (11) an output means for routing said data unit to a network element associated with a remaining SNPA;

at least one section data connection for providing section data communications channels between said network elements;

at least one line data connection for providing line data communications channels between said network elements; and a local compunctions connection for providing data communications with local communications networks.

* * * * *